United States Patent [19]

Spencer

[11] 4,122,590

[45] Oct. 31, 1978

[54] MEANS AND METHOD OF INSTALLING EMITTERS IN IRRIGATION TUBING

[76] Inventor: Lloyd Spencer, 220 Patrician Way, Pasadena, Calif. 91105

[21] Appl. No.: 794,977

[22] Filed: May 9, 1977

[51] Int. Cl.² .................. B23P 15/00; B23P 13/00; B23P 23/00
[52] U.S. Cl. .................. 29/157 C; 29/33 K; 29/33 T; 29/428; 83/54; 83/188; 29/564.2
[58] Field of Search .............. 29/453, 428, 819, 820, 29/283, 282, 33 K, 33 T, 564.2, 157 C; 83/54, 188, 178

[56] References Cited

U.S. PATENT DOCUMENTS

| 1,264,854 | 4/1918 | Possons | 29/157 C |
|---|---|---|---|
| 1,519,010 | 12/1924 | Reznor | 29/157 C |
| 2,164,267 | 6/1939 | Black | 29/564.2 |
| 2,273,185 | 2/1942 | Engler et al. | 83/188 |
| 2,645,164 | 7/1953 | Ofenstein et al. | 83/188 |
| 2,935,341 | 5/1960 | Steiner | 83/54 |
| 3,288,006 | 11/1966 | Erlandson | 83/54 |
| 3,698,274 | 10/1972 | Coulon et al. | 83/54 |

FOREIGN PATENT DOCUMENTS

| 1,107,886 | 1/1956 | France | 83/54 |
|---|---|---|---|
| 216,239 | 7/1968 | U.S.S.R. | 83/54 |

*Primary Examiner*—C.W. Lanham
*Assistant Examiner*—Daniel C. Crane

[57] ABSTRACT

A means and method of installing emitters in irrigation tubing, wherein a core assembly dimensioned for ready insertion in a thinwall irrigation tube is provided with internal rollers which are confronted by fixed external rollers positioned to function through the walls of the irrigation tube so as to retain the core assembly in a fixed position as the tubing is moved between the internal and external rollers; the core assembly including an anvil periodically engaged by an external radially movable cutting tool to form in the irrigation tube a series of emitter receiving perforations; the core assembly also including a fork member for spacing the perforated wall of the irrigation tube from the opposite wall thereof to facilitate reception of emitters forced therein by an external mandrel; the anvil and fork and their respective cutting tool and mandrel adapted to be spaced at preselected distances depending on the required emitter spacing.

10 Claims, 8 Drawing Figures

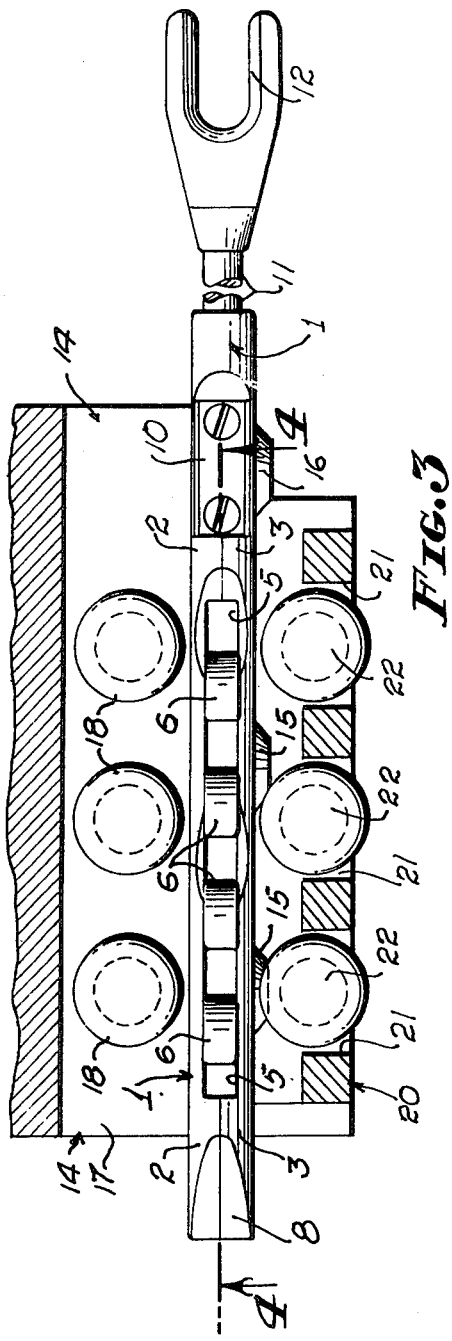
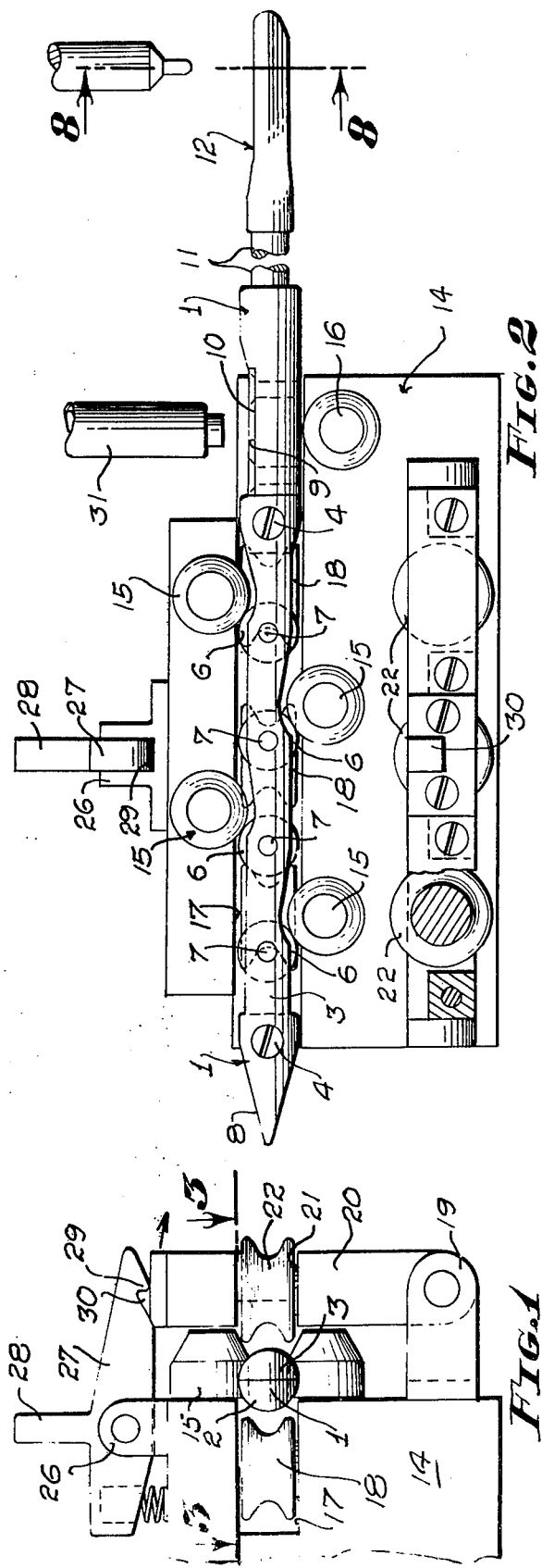

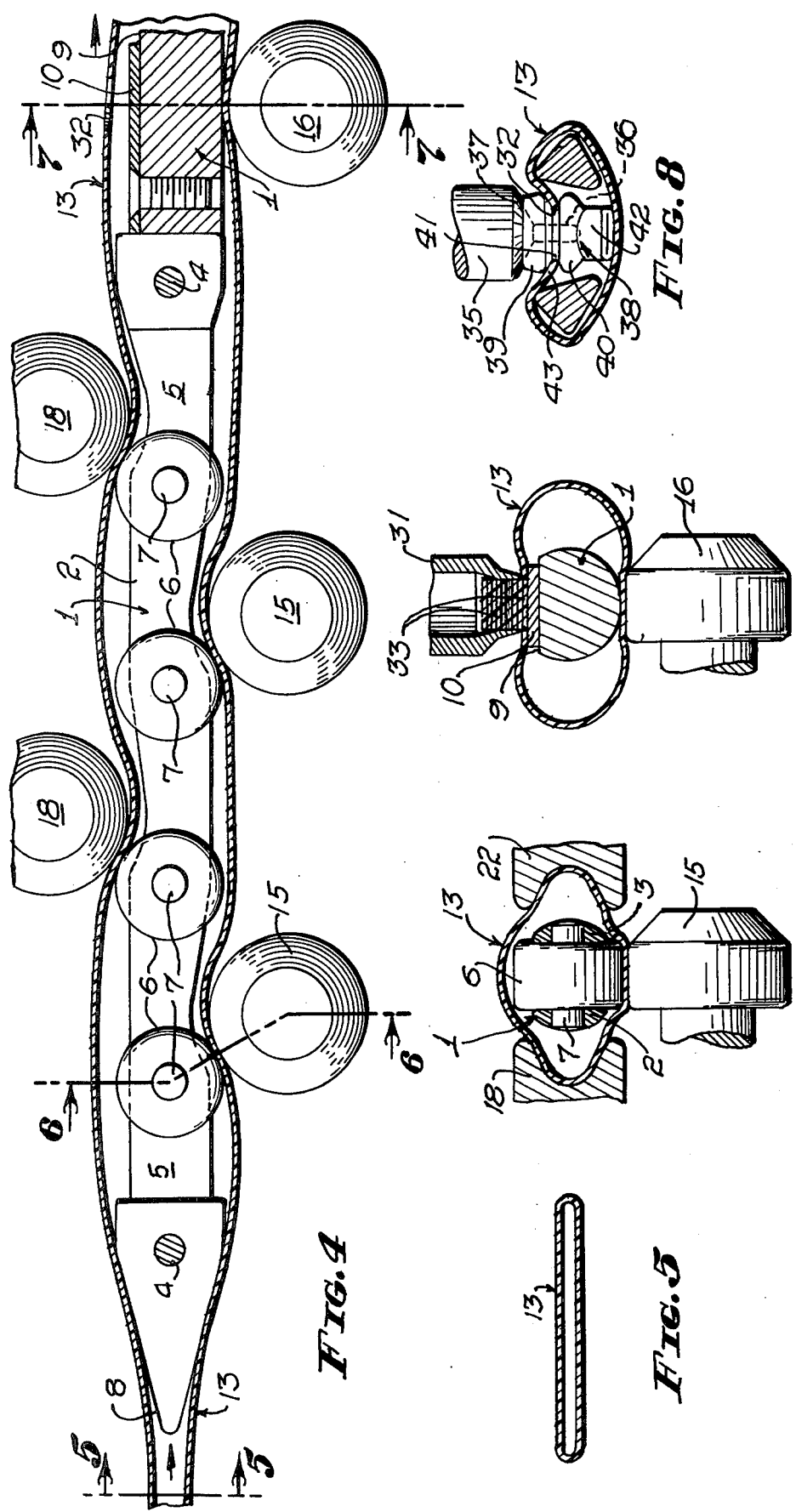

MEANS AND METHOD OF INSTALLING EMITTERS IN IRRIGATION TUBING

BACKGROUND AND SUMMARY

In the development of drip irrigation, it has become feasible to utilize a thinwall irrigation tube capable of being flattened and compactly rolled to minimize storage and shipping space as well as to be produced at a minimum cost. Such tubing, provided with extremely small drip openings is widely used; however, the problem of filtration to prevent clogging is a substantial one, and the service life is short. Also the rate of flow through such openings vary with pressure.

The present invention is directed to a means and method of installing emitters in such irrigation tubes; particularly emitters of the type which undergo momentary flushing at the beginning and the end of the irrigation cycle as well as to effect constant flow over a substantial pressure range. Such emitters being disclosed in a copending patent application Ser. No. 783,291. The present invention is summarized in the following objects:

First, to provide a means and method of installing emitters in an irrigation tube wherein a core assembly is received in the tube and is engaged externally through the walls of the tube so as to remain fixed in position while the tube is readily moved axially;

Second, to provide a means and method, as indicated in the preceding object wherein the core assembly and the structure surrounding the irrigation tube include novelly arranged pairs of internal and external rollers which provide minimal resistance to movement of the tube;

Third, to provide a means and method, as indicated said the preceeding objects, wherein the core assembly includes an anvil member and a fork member which may be disposed at different spacings and which cooperate respectively with an external cutting die to form perforations in the tube, and an external emitter inserting tool to effect proper placement of the emitters.

BRIEF DESCRIPTION OF THE FIGURES

FIG. 1 is a view of the irrigation tube receiving end of the emitter installing means with the hinged access panel in its closed position.

FIG. 2 is a longitudinally side view thereof with the access panel open.

FIG. 3 is a partial sectional, partial plan view taken through 3—3 of FIG. 1.

FIG. 4 is an enlarged side view sectional view taken through 4—4 of FIG. 3 showing the core assembly disposed within an irrigation tube.

FIG. 5 is a transverse sectional view of the irrigation tube taken through 5—5 of FIG. 4.

FIG. 6 is a transverse sectional view taken through 6—6 of FIG. 4, showing an internal and an external roller engaging the irrigation tube to immobilize the core assembly while permitting longitudinal movement of the irrigation tube.

FIG. 7 is a transverse sectional view taken through 7—7 of FIG. 4 showing the cutting die and anvil.

FIG. 8 is a transverse sectional view taken through 8—8 of FIG. 2 and enlarged to compare with FIG. 4 showing an emitter being pressed into a perforation.

DETAILED DESCRIPTION

The means of installing emitters in an irrigation tube includes a core assembly 1 having a fixed core bar 2 and a removable core bar 3. The bars are complementary and are joined at the ends of the removable bar 3 by screws 4. The bars define a central longitudinal slot 5 which receives a set of rollers 6, having journal pins 7 received in the bars 2 and 3. The bar 2 extends beyond the bar 3 and has a pointed or tapered tubing receiving end 8. The opposite extended end of the bar 2 forms an anvil base 9 on which is secured a replaceable anvil plate 10. The plane of the anvil plate is parallel to the axes of the rollers 6. Beyond the anvil base 9, the bar 2 is provided with a screwthreaded axially disposed socket which receives an extension rod 11 the extremity of which receives a fork 12.

The core assembly is dimensioned to fit freely within a standard thin wall irrigation tube 13. A standard size for such tubing when pressurized to form a cylinder is approximately ⅝ inch (15.875mm) in diameter. The wall thickness is in the range between 0.015 and 0.030 inch (0.381mm to 0.762mm) depending upon the plastic material from which the tube is extruded. To facilitate storage and shipment it is preferred that the irrigation tube be flat essentially as shown in FIG. 5. However, the tube may be essentially oval. In either case the opposing walls of smaller radius are capable of being pressed toward each other to reduce frictional load of the core assembly.

Disposed externally of the irrigation tubing 13 at one side of the core assembly is a fixed mounting block or panel 14. Mounted on the block is an upper and a lower pair of core retainer rollers 15 so spaced as to confront the rollers 6 and restrain the core assembly from axial movement. The interposed wall of the irrigation tube, as shown in FIG. 4, is readily pulled between the sets of retainer rollers 6 and 15.

A roller 16, similar to the retainer rollers 15, is disposed under the anvil base 9 with sufficient clearance to permit free movement of the irrigation tube 13.

In order to restrain the core assembly from lateral displacement in one direction, the mounting block 14 is provided with a slot 17 which receives a fixed set of grooved centering rollers 18. Joined to the fixed mounting block by a hinge 19 is a movable mounting block or panel 20 having slots 21 which receive a second set of centering rollers 22. The centering rollers 22 are movable between a position coplanar and opposed to the centering rollers 18 as shown in FIG. 1 and an open position exposing the core assembly and centering rollers 18 as shown in FIG. 2. When the mounting block 20 and its centering rollers 22 are in their open position, the core assembly and a surrounding irrigation tube may be inserted between the upper and lower retainer rollers 15, whereupon the mounting block 20 and centering rollers 22 are moved from the position shown in FIG. 2 to the position shown in FIGS. 1 and 6.

In order to secure the movable mounting block 22 in operative relation to the fixed mounting block 14, the fixed mounting block is provided with a yoke 26 in which is pivoted a latch lever 27 having a handle 28 and a latch hook 29 which engages a keeper 30 on the movable mounting block 22 as shown in FIG. 1.

Disposed above the anvil plate 10 is a tubular cutting die 31 which is adapted to be rotated and moved axially by conventional means, not shown. The extremity of the die is sharp so as to readily cut through the wall of the irrigation tube and form a perforation 32. The severed disk 33 is pressed upward in the die as new disks are cut. The internal diameter of the die is enlarged, as indicated by 34, a short distance from the cutting edge. If desired, the anvil plate and die may be inverted for removal of the disks by gravity.

In order to perforate the irrigation tube, the tube is advanced intermittently preselected distances such as 1, 2 or 3 feet or the selected metric distances. For this purpose, a set of rods 11 of selected lengths including forks 12 are provided so that each perforation registers with the fork when a subsequent perforation is being formed.

Suitably disposed above or below the fork 12, depending upon the location of the perforation 32, is an emitter inserting tool 35 having a pin 36 and a tapered shoulder 37. The tool is moved radially with respect to the irrigation tube by conventional means, not shown.

One type of emitter, designated 38, suitable for insertion, is disclosed more fully in the previously mentioned application Ser. No. 783,291. This emitter includes an outer flange 39, and an inner flange 40 defining with the outer flange an annular channel 41. The emitter is tubular and its inner end 42 continuing from the flange 41 is collapsible at low pressure from a flush flowing condition to a drip flowing condition.

The method of installing the emitters in the irrigation tube is as follows:

The core assembly is inserted into the irrigation tube tapered end 8 first. While the core assembly is readily inserted, some friction exists depending upon how flat the normal profile of the irrigation tube is. The core assembly and irrigation tube is then pressed laterally against the fixed retainer rollers 15. The movable mounting block 20 is then pivoted and latched to position, the movable retainer rollers 22 in opposing relation to the rollers 15, causing the lateral margins of the irrigation tube to conform to the grooves 24 and squeeze the irrigation tube toward a cylindrical configuration minimizing the friction between the irrigation tube 13 and the core assembly 1.

The irrigation tube 13 is then moved longitudinally such as by unrolling the irrigation tube from one drum, passing the tube over the core assembly, and winding on a second drum. The irrigation tube is moved intermittently either manually or by appropriate automatic control, not shown. Each time the irrigation tube is stopped, the cutting die 34 forms a perforation 32 by contact with the anvil plate 10. Simultaneously the preceding perforation receives an emitter unit 38 mounted on the inserting tool 35, which may be manually operated or preferably operated by appropriate automatic mechanical control, not shown. In either case, the inserting tool 35 is pressed radially inwardly toward the perforation 32 causing the emitter tube 42 and inner flange 40 to enter the irrigation tube 13 and the channel 41 to be received in the perforation 32. The insertion is aided by the fork 12 which spaces the upper and lower sides of the irrigation tube and permits the perforated upper portion to assume a conical shape, as indicated by 43, and remain under tension as the inner flange is pressed through the perforation.

Having fully described may invention it is to be understood that I am not to be limited to the details herein setforth, but that my invention is of the full scope of the appended claims.

I claim:

1. A means for inserting emitter units into a flexible wall irrigation tube, comprising:
   a. a core assembly having a body dimensioned to move freely in an irrigation tube of a selected size;
   b. internal rollers carried by the body positioned to contact axially offset diametrically disposed portions of the inner surface of the irrigation tube;
   c. external rollers positioned to engage corresponding axially offset diametrically disposed portions of the outer surface of the irrigation tube, the relative positions of the internal and external rollers being such as to restrain the core assembly against longitudinal movement in at least one longitudinal direction while permitting passage of the irrigation tube between the pairs of the internal and external rollers;
   d. perforating means including an internal element fixed to the core assembly and a radially movable external element engageable with the internal element to effect a perforation in the irrigation tube;
   e. and an emitter inserting means including an internal in fixed to the core in preselected spaced relation to the perforating means and an external element adapted to removably receive an emitter and move the emitter radially into cooperative relation with the internal element to secure the emitter with respect to the perforation.

2. A means for inserting emitter units as defined in claim 1, wherein:
   a. external centering rollers confront opposite sides of the core assembly and engage the corresponding sides of the irrigation tube to maintain the core assembly in centered position within the irrigation tube.

3. A means for inserting emitter units as defined in claim 1, wherein:
   a. the irrigation tube has a major diameter and a minor diameter;
   b. the internal rollers are received between the portions of the irrigation tube defining its minor diameter;
   c. and the centering rollers engage external portions of the irrigation tube defining the major diameter to urge the irrigation tube toward a cylindrical profile to reduce friction between the core assembly and the irrigation tube and to maintain the core assembly in a centered position.

4. A means for inserting emitter units as defined in claim 1, wherein:
   a. the internal element of the perforating means is an anvil and the external element is a rotatable tubular cutting die.

5. A means for inserting emitter units as defined in claim 1, wherein:
   a. the internal element of the inserting means is a fork open at its end toward which the irrigation tube moves and serving to space opposite walls thereof, and the external element is a shaft having a projection for frictionally receiving an emitter element.

6. Means for installing tubular emitter units into a flexible thin wall irrigation tube having a major diameter and a minor diameter, each emitter unit having a collapsible stem, a pair of flanges and an annular channel between the flanges, said installing means, comprising:
   a. an essentially cylindrical core dimensioned for sliding movement within the irrigation tube;

b. internal rollers carried by the core for contact with the inner surfaces of axially offset, diametrically disposed portions of the irrigation tube which define the minor diameter thereof;

c. external rollers radially overlapping the internal rollers and engaging the external surfaces of the portions of the irrigation tube engaged by the internal rollers;

d. the internal and external rollers permitting longitudinal movement of the irrigation tube while restraining the core against axial displacement;

e. perforating means including an anvil carried by the core, and a radially movable external die for cutting the irrigation tube and form perforations at preselected intervals;

f. and an emitter inserting means located a distance from the perforating means corresponding to the spacing means between perforations, said inserting means including a fork having a pair of parallel prongs facing the direction of movement of the irrigation tube and spacing the opposite wall portion thereof from the perforation, the emitter inserting means also including a shaft removably supporting an emitter unit, and movable toward the perforation and fork to press the emitter tube and inner flange through the perforation until the emitter channel is received therein.

7. An emitter installation means, as defined in claim 6, wherein:

a. opposed sets of rollers engage the portions defining the major diameter of the irrigation tube to urge the tube toward a cylindrical profile to minimize the force required to effect longitudinal movement of the irrigation tube, and to center the irrigation tube with respect to the core.

8. Means for perforating flexible tubing, comprising:

a. a core unit dimensioned for axial sliding movement within the tubing;

b. a set of axially displaced internal rollers carried by the core unit and positioned for rolling contact with the internal surface of the tubing;

c. a core retainer unit disposed externally of the tubing in registry with the core unit;

d. a set of external rollers carried by the restraining unit and displaced in axial correspondence with the internal rollers, the external rollers effecting local depression of the internal surface of the tubing into contact with the internal rollers; whereby, on axial movement of the tubing the core unit remains fixed within the tubing;

e. means for effecting axial movement of the tubing between the external and internal rollers;

f. and tool means including a fixed internal tool element carried by the internal core and an external tool element positioned for periodic engagement with the internal tool element.

9. A method for installing emitters in flexible irrigation tubes, characterized by:

a. inserting a core having rollers into an irrigation tube;

b. rotatably engaging the irrigation tube externally to depress the irrigation tube into restraining contact with the core rollers;

c. moving the irrigation tube axially while the core is restrained;

d. utilizing the restrained core and an external tool to perforate the tubing at selected intervals;

e. and utilizing the core and an external tool to install emitters in the perforations.

10. A method of perforating flexible tubing, characterized by:

a. inserting a core structure, including rollers, into a flexible tube;

b. positioning a restrainer structure, including rollers, externally of the flexible tube to depress the tube into restraining contact with the core structure rollers;

c. moving the flexible tube axially while the core structure is restrained by the external restraining structure;

d. and utilizing the restrained core and an external tool to perforate the flexible tube at selected intervals.

* * * * *